United States Patent
Ogura

(10) Patent No.: US 8,517,501 B2
(45) Date of Patent: Aug. 27, 2013

(54) ENCODER SENSOR AND IMAGE FORMING APPARATUS INCLUDING THE ENCODER SENSOR

(75) Inventor: Yoshimitsu Ogura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 106 days.

(21) Appl. No.: 13/014,333

(22) Filed: Jan. 26, 2011

(65) Prior Publication Data

US 2011/0193930 A1 Aug. 11, 2011

(30) Foreign Application Priority Data

Feb. 6, 2010 (JP) ................................. 2010-024911

(51) Int. Cl.
*B41J 29/393* (2006.01)
(52) U.S. Cl.
USPC .......................................................... 347/19
(58) Field of Classification Search
USPC .... 347/229, 234, 248, 32, 38, 19; 318/400.4; 250/231.13–231.18
See application file for complete search history.

(56) References Cited

U.S. PATENT DOCUMENTS

| | | | | |
|---|---|---|---|---|
| 3,421,012 A | * | 1/1969 | Johnson, Jr | 250/233 |
| 4,833,316 A | * | 5/1989 | Yoneda | 250/231.16 |
| 4,840,488 A | * | 6/1989 | Kabaya et al. | 356/619 |
| 4,883,955 A | * | 11/1989 | Kawasaki et al. | 250/231.16 |
| 5,177,356 A | * | 1/1993 | Matsui et al. | 250/231.16 |
| 5,428,217 A | * | 6/1995 | Nakajima et al. | 250/214.1 |
| 5,479,010 A | * | 12/1995 | Shimomura et al. | 250/231.13 |
| 6,774,355 B2 | * | 8/2004 | Kudo | 250/231.13 |
| 6,784,417 B2 | * | 8/2004 | Sonoki | 250/231.13 |
| 6,794,636 B1 | * | 9/2004 | Cardillo et al. | 250/231.13 |
| 7,435,945 B2 | * | 10/2008 | Shimomura et al. | 250/231.13 |
| 7,532,370 B2 | * | 5/2009 | Kudo et al. | 358/474 |
| 7,714,272 B2 | * | 5/2010 | Urabe | 250/231.13 |
| 7,795,576 B2 | * | 9/2010 | Chin et al. | 250/231.13 |
| 2008/0225070 A1 | | 9/2008 | Morishita et al. | |
| 2009/0028586 A1 | | 1/2009 | Yamashiro et al. | |
| 2009/0237744 A1 | | 9/2009 | Ogura et al. | |
| 2010/0196025 A1 | | 8/2010 | Ogura | |
| 2010/0252722 A1 | * | 10/2010 | Procsal et al. | 250/231.14 |

FOREIGN PATENT DOCUMENTS

| | | | |
|---|---|---|---|
| JP | 59099311 A | * | 6/1984 |
| JP | 2007-055050 | | 3/2007 |
| JP | 2008-179103 | | 8/2008 |

\* cited by examiner

*Primary Examiner* — Hai C Pham
(74) *Attorney, Agent, or Firm* — IPUSA, PLLC

(57) ABSTRACT

An encoder sensor for reading plural slits of an encoder scale includes a light emitting part configured to emit light and a light receiving part configured to receive the light emitted from the light emitting part. The light emitting part is configured to emit the light from plural areas arranged in a direction orthogonal to a direction in which the plural slits are arranged.

12 Claims, 14 Drawing Sheets

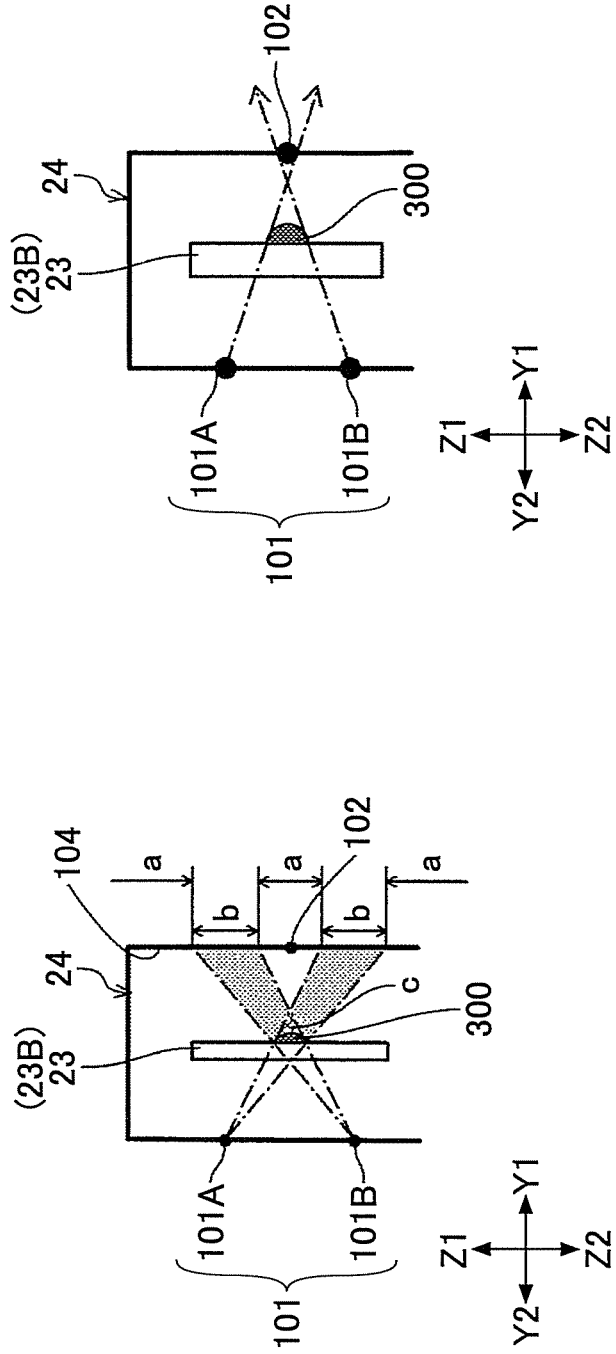

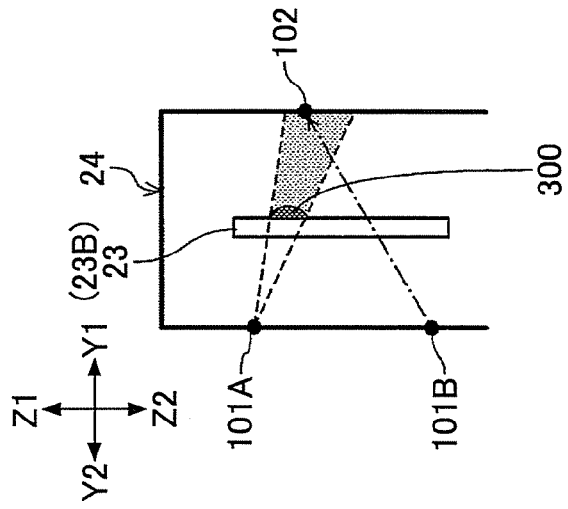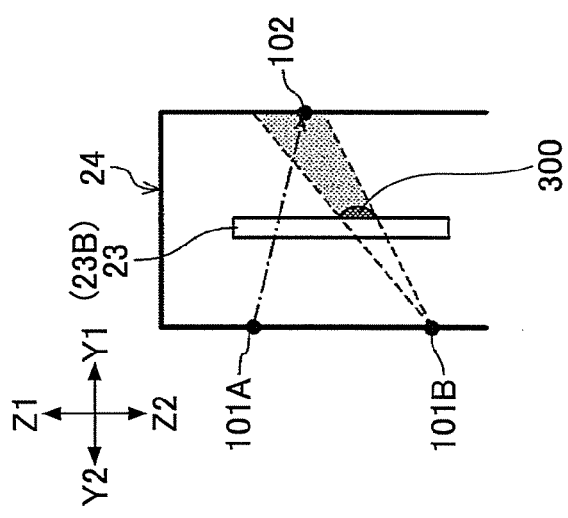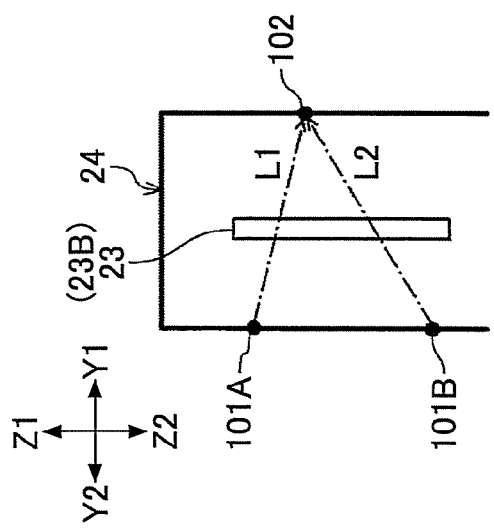

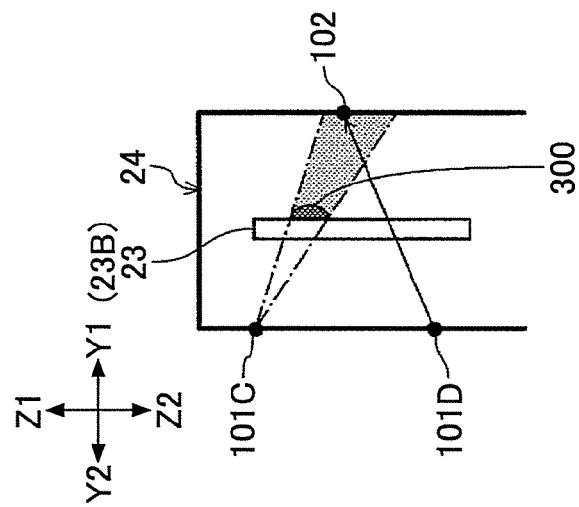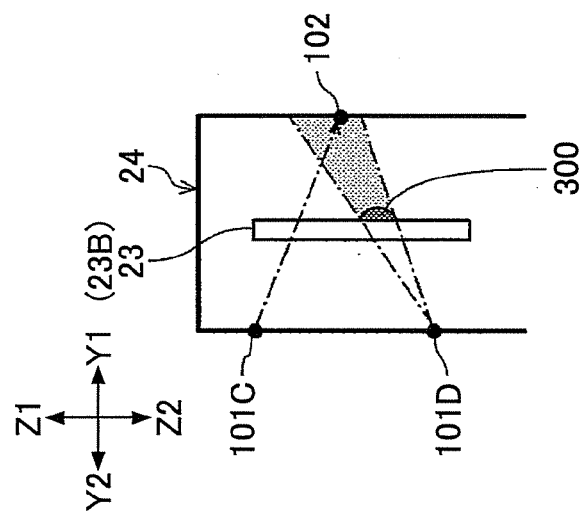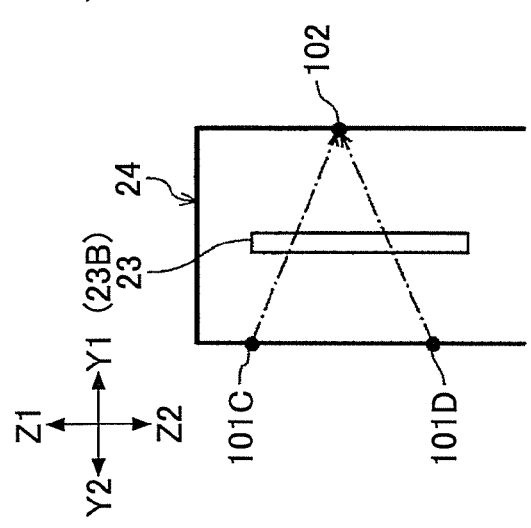

ENCODER SENSOR AND IMAGE FORMING APPARATUS INCLUDING THE ENCODER SENSOR

BACKGROUND OF THE INVENTION

1. Field of the Invention

The present invention relates to an encoder sensor and an image forming apparatus including the encoder sensor.

2. Description of the Related Art

A printer, a facsimile, a copier, a plotter, or a multifunction machine including functions of a printer, a facsimile, a copier, and a plotter are known examples of an image forming apparatus. The image forming apparatus may be a liquid jet recording type image forming apparatus using a recording head that ejects ink droplets. The liquid jet recording type image forming apparatus performs image forming (also referred to as "recording", "character printing", "image printing", "printing") by ejecting ink droplets from a recording head to a conveyed sheet of paper. The liquid jet recording type image forming apparatus includes a serial type image forming apparatus and a line type image forming apparatus. The serial type image forming apparatus performs image forming by ejecting ink droplets from a recording head while moving the recording head in a main scanning direction. The line type image forming apparatus performs image forming by ejecting ink droplets from a recording head without moving the recording head.

It is to be noted that, in the below-described embodiments of the present invention, the term "image forming apparatus" refers to an apparatus that performs image forming by, ejecting ink droplets onto a medium such as paper material, thread material, fiber material, cloth material, leather material, metal material, plastic material, glass material, wood material, and/or ceramic material. Further, the term "image forming" not only refers to ejecting ink droplets onto a medium for forming an image having significance such as a character or a figure but also refers to simply allowing ink droplets to drop onto a medium for forming an image having no particular significance such as a pattern. Further, the term "ink" not only refers to ink but also refers to liquids that can be used for image forming such as a recording liquid, a fixing solution, or a resin liquid. Further, the term "sheet of paper" not only refers to a sheet of paper material but also refers to a sheet of material to which droplets of ink are applied (e.g., OHP sheet, sheet of cloth). The sheet of paper may also be referred to as a target recording medium, a recording medium, or recording paper. Further, the term "image" not only refers to a flat two-dimensionally formed image but also refers to a three-dimensionally formed image.

Further, it is to be noted that an image forming part included in a liquid jet type image forming apparatus according to the below-described embodiments of the present invention is not limited to a liquid jet.

One example of the liquid jet type image forming apparatus is the serial type image forming apparatus. The serial type image forming apparatus includes a linear encoder (position detection apparatus) having an encoder scale and an encoder sensor. The encoder scale is positioned along a main scanning direction of a carriage on which a liquid jet head is mounted. The encoder sensor is for reading patterns (position distinguishing parts) of the encoder scale. Thereby, the linear encoder detects the position and speed of the carriage and controls, for example, the speed of the carriage or the driving of the liquid jet head based on the detection results. Another example of the liquid jet type image forming apparatus includes a rotary encoder (position detection apparatus) having a wheel-like encoder scale (also referred to as "encoder wheel") and an encoder sensor. The wheel-like encoder scale is provided to a conveying part (e.g., a roller, belt) conveying a target recording medium on which an image is formed by an image forming part. The encoder sensor is for reading patterns of the wheel-like encoder scale. Thereby, the rotary encoder detects the position and speed of the conveying part and controls, for example, the driving of the conveying part based on the detection results.

There are various types of conventional linear encoders such as a magnetic type linear encoder or an optical type linear encoder. For example, the magnetic type linear encoder has an advantage of having its performance hardly affected by a small amount of stain on a surface of the linear scale. However, the magnetic type linear encoder has disadvantages such as difficulty in attaining precise resolution, difficulty in increasing the gap between the linear scale and the encoder sensor, difficulty in achieving precise attachment, and difficulty of handling magnetic tools. On the other hand, the optical type linear encoder, for example, has advantages such as being relatively easy to increase the gap between the encoder scale and the encoder sensor, being easy to assemble, and being suitable for attaining precise resolution.

Due to increasing resolution of the linear encoder along with the increasing speed and precision of the image forming apparatus, liquid and paper particles or the like become scattered inside the image forming apparatus. This leads to problems such as output being degraded and signals being erroneously output. For example, in a case where the image forming apparatus is used for a long period, ink mist and paper particles adhere to the encoder scale and the encoder sensor. This leads to readout errors. Such readout errors cause deviation of the position of the carriage that result in disarrangement of recorded images and generation of errors that result in shutdown of the image forming apparatus.

In light of the above, there is proposed an inkjet recording apparatus including an encoder sensor provided with plural LEDs of different colors for utilizing an aspect that the wavelength of absorbable light is different depending on the color of ink mist (see, for example, Japanese Laid-Open Patent Publication No. 2007-55050 (Patent Document 1)). This inkjet recording apparatus anticipates the color of ink mist adhered to the encoder scale based on the value obtained by counting ejected ink droplets and switches the color of light irradiated from the LED for preventing light from being absorbed.

Further, there is proposed an image forming apparatus including a cleaning member attached to a lower side of an encoder sensor for cleaning the surface of an encoder scale (see, for example, Japanese Laid-Open Patent Publication No. 2008-179103 (Patent Document 2)). This image forming apparatus also includes a gap position changing part which raises/lowers a carriage between a cleaning position (position where the cleaning member contacts the surface of the encoder scale) and a withdrawing position (position where the cleaning member does not contact the surface of the encoder scale). Accordingly, the image forming apparatus uses the cleaning member to clean the stains adhered to the surface of the encoder scale by moving the carriage in the main scanning direction to a state where the cleaning member is in the cleaning position.

However, with the inkjet recording apparatus of Patent Document 1, there may be a case where there is no difference in the wavelengths of absorbable light depending on the characteristics of the ink mist adhered to the encoder scale. In such a case, light cannot be prevented from being absorbed. Further, although the inkjet recording apparatus of Patent Document 1 may prevent the performance of the encoder sensor from degrading in a case where a large amount of a single color ink is used, degradation of the performance of the encoder sensor cannot be prevented in a case where ink of all colors are uniformly used. Further, the inkjet recording apparatus of Patent Document 1 cannot handle a problem where a substance other than ink mist adheres to the encoder sensor.

With the image forming apparatus of Patent Document 2, it is difficult to completely remove stains from the surface of the encoder scale by using the cleaning member. Further, the image forming apparatus of Patent Document 2 cannot sufficiently prevent detection precision from degrading.

SUMMARY OF THE INVENTION

The present invention may provide an encoder sensor and an image forming apparatus including the encoder sensor that substantially eliminates one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by an encoder sensor and an image forming apparatus including the encoder sensor particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides an encoder sensor for reading plural slits of an encoder scale, the encoder sensor including: a light emitting part configured to emit light; and a light receiving part configured to receive the light emitted from the light emitting part; wherein the light emitting part is configured to emit the light from plural areas arranged in a direction orthogonal to a direction in which the plural slits are arranged.

Further, another embodiment of the present invention provides an image forming apparatus including: an encoder scale including plural slits; and an encoder sensor for reading the plural slits of the encoder scale, the encoder sensor including a light emitting part configured to emit light, and a light receiving part configured to receive the light emitted from the light emitting part; wherein the light emitting part is configured to emit the light from plural areas arranged in a direction orthogonal to a direction in which the plural slits are arranged.

Other objects, features and advantages of the present invention will become more apparent from the following detailed description when read in conjunction with the accompanying drawings.

BRIEF DESCRIPTION OF THE DRAWINGS

FIGS. 5A and 5B are schematic diagrams for describing the effects attained by an encoder according to an embodiment of the present invention;

FIGS. 8A-8C are schematic diagrams illustrating an encoder including an encoder sensor according to a first example of a second embodiment of the present invention;

FIGS. 9A-9C are schematic diagrams illustrating an encoder including an encoder sensor according to a second example of a second embodiment of the present invention;

DETAILED DESCRIPTION OF THE PREFERRED EMBODIMENTS

Figure 1:
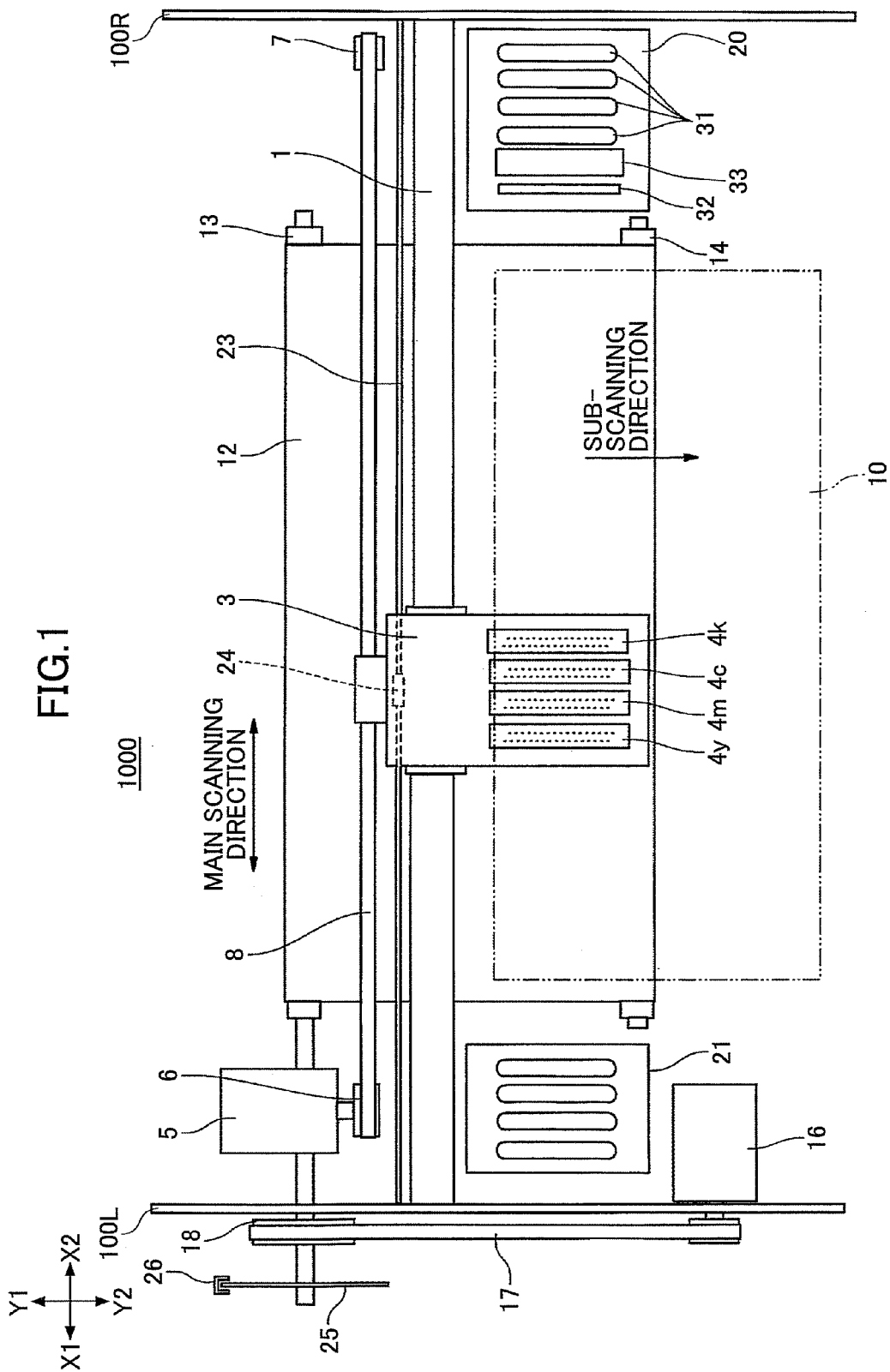
FIG. 1 is a plan view schematically illustrating a configuration an inkjet recording apparatus (image forming apparatus) according to an embodiment of the present invention.
Figure 2:
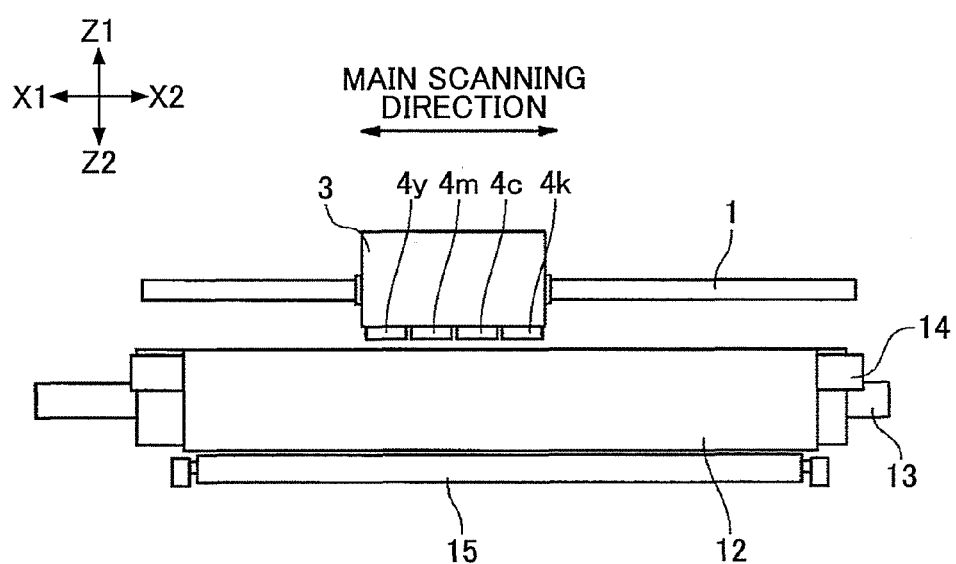
FIG. 2 is a front view schematically illustrating a configuration of an inkjet recording apparatus according to an embodiment of the present invention.

First, an image forming apparatus (in this embodiment, inkjet recording apparatus) 1000 according to an embodiment of the present invention is described with reference to FIGS. 1 and 2. FIG. 1 is a plan view schematically illustrating a configuration of an inkjet recording apparatus 1000 according to an embodiment of the present invention. FIG. 2 is a front view schematically illustrating a configuration of the inkjet recording apparatus 1000 according to an embodiment of the present invention. In the accompanying drawings, the direction indicated with arrows X1-X2 is a width (horizontal) direction of the image forming apparatus 1000, the direction indicated with arrows Y1-Y2 is a depth direction of the image forming apparatus 1000, and the direction indicated with arrows Z1-Z2 is a height direction of the image forming apparatus 1000.

The inkjet recording apparatus 1000 includes a carriage 3 that is slidably supported by a main guide rod 1 traversed between a left side plate 1001, and a right side plate 100R and a sub guide rod (not illustrated). The inkjet recording apparatus 1000 also includes a main scanning motor 5 causing (driving) the carriage 3 to move in a main scanning direction via a timing belt 8 span between a driving pulley 6 and a driven pulley 7.

The carriage 3 includes recording heads 4y, 4m, 4c, 4k including liquid jet heads corresponding to yellow (Y) ink, magenta (M) ink, cyan (C) ink, and black (K) ink. It is to be noted that the recording heads 4y, 4m, 4c, and 4k may also be collectively referred to as a recording head 4. The recording heads 4y, 4m, 4c, and 4k have an array of plural nozzles arranged in a sub-scanning direction that is orthogonal to the main scanning direction. The recording heads 4y, 4m, 4c, and 4k are attached to the carriage 3 in a manner that the ink ejecting direction of the recording heads 4y, 4m, 4c, and 4k is aimed downward.

The liquid jet head of the recording head 4 may include a pressure generation part that generates pressure for ejecting liquid from the liquid jet head. The pressure generation part may be, for example, a piezoelectric element (piezoelectric actuator), a thermal actuator that uses an electrothermal element (e.g., heat element) to cause phase change by film boiling, a shape memory alloy actuator using metal phase change by temperature change, or an electrostatic actuator using electrostatic force.

The inkjet recording apparatus 1000 also includes a conveyor belt (conveying part) 12. The conveyor belt 12 attracts a sheet(s) of paper 10 with electrostatic force and conveys the paper 10 to a position facing the recording head 4. The conveyor belt 12 is an endless belt spanning between a conveyor roller 13 and a tension roller 14 and configured to rotate in a belt conveying direction (sub-scanning direction). The conveyor belt 12 is charged (supplied with charge) by a charging roller 15.

Further, the conveyor belt 12 is rotated in the sub-scanning direction by rotating the conveyor roller 13 with a sub-scanning motor 16 via a timing belt 17 and a timing pulley 18.

The inkjet recording apparatus 1000 also includes a maintenance/recovery mechanism 21 for maintaining/recovering the recording head 4 and a blank ejection receiver 20 for receiving droplets of ink not contributing to image forming (blank ink droplets). The maintenance/recovery mechanism 21 is provided at the side of the conveyor belt 12 towards one side in the main scanning direction of the carriage 3. The blank ejection receiver 20 is provided at the side of the conveyor belt 12 towards the other side in the main scanning direction of the carriage 3.

The blank ejection receiver 20 includes plural cap members 31 for capping the nozzle surfaces of, each of the four recording heads 4 (4y, 4m, 4c, and 4k), a wiper member 32 for wiping the nozzle surfaces, and a receiving part 33 for receiving blank ink droplets from the recording head 4.

The inkjet recording apparatus 1000 also includes a linear encoder (main scanning encoder) having an encoder scale 23 and a linear encoder sensor 24 for detecting movement of the carriage 3. The encoder scale 23 includes predetermined patterns (also referred to as "position distinguishing parts", "calibrations", or "slits") 23A, 23B arranged in the main scanning direction between the left side plate 100L and the right side plate 100R. The encoder sensor 24 is provided in the carriage 3. In this embodiment, the linear encoder sensor 24 may be a transparent type photosensor for reading (detecting) the slits 23A, 23B of the encoder scale 23.

Further, the inkjet recording apparatus 1000 also includes a rotary encoder (sub-scanning encoder) having an encoder scale (code hole) 25 and a rotary encoder sensor 26 for detecting the amount of movement and the position of the conveyor belt 12. The encoder scale (code hole) 25, which is attached to a shaft of the conveyor roller 13, includes predetermined patterns (slits) 25A, 25B arranged in a peripheral direction of the encoder scale 25. In this embodiment, the rotary encoder sensor 26 may be a transparent type photosensor for reading (detecting) the slits 25A, 25B of the encoder scale 25.

Figure 16A:
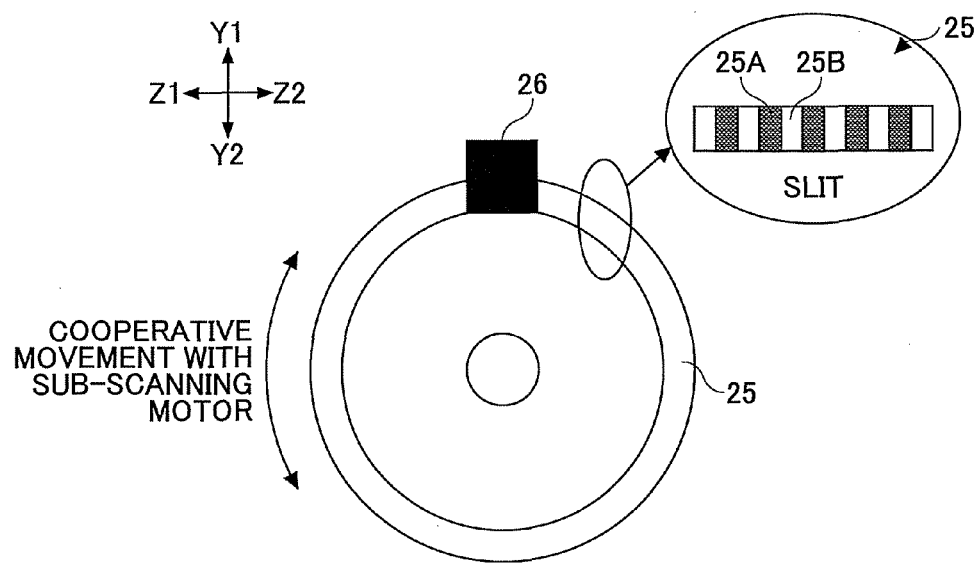
FIGS. 16A-16B are schematic diagrams for describing a rotary encoder including an encoder sensor and an encoder sheet according to an embodiment of the present invention.
Figure 16B:
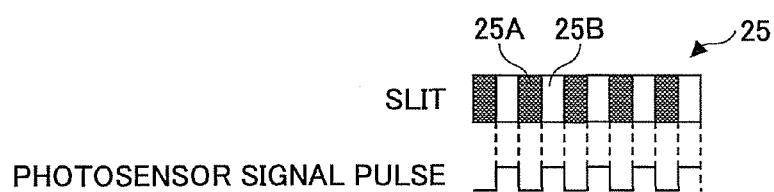

FIG. 16A is a side view of the rotary encoder including the encoder sensor 26 and the encoder scale (encoder sheet) 25 according to an embodiment of the present invention. FIG. 16B is a schematic diagram for describing the rotary encoder including the encoder sensor 26 and the encoder scale (encoder sheet) 25 and pulses detected by the rotary encoder according to an embodiment of the present invention. As illustrated in FIGS. 16A and 16B, the encoder sensor 26 is configured to convert the rotation of the slits 25A, 25B of the encoder scale 25 into signals (pulses) and output the signals to the I/O 213 of the control part 200. The encoder scale 25, which is attached to the shaft of the conveyor roller 13, is configured to rotate in correspondence with the rotation of the sub-scanning motor 16. The interval of the slits 25A, 25B of the encoder scale 25 is set as a design value. Accordingly, by detecting changes of the pulses corresponding to the signals of the encoder sensor 26, the amount of rotation of the encoder scale 25 can be detected. Further, the pulses corresponding to the signals (detection results) of the encoder sensor 26 are input to the I/O 213 of the control part 200.

In the inkjet recording apparatus 1000 having the above-described configuration, a sheet of the paper 10 is fed from a sheet-feed tray (not illustrated) onto the conveyor belt 12 which is electrically charged. Thereby, the paper 10 is attracted to conveyor belt 12 and is conveyed in the sub-scanning direction by rotating the conveyor belt 12. The conveying of the paper 10 is stopped when the paper 10 reaches a position facing the recording head 4. Then, a first line is recorded on the paper 10 by ejecting ink droplets to the paper 10. The ink droplets are ejected by driving the recording head 4 according to image signals while moving the carriage 3 in the main scanning direction. Then, after conveying the paper 10 for a predetermined distance, the next line is recorded on the paper 10. After receiving a recording completion signal or a signal indicating that a rear end of the paper 10 has reached a recording area, the recording process is terminated. Then, the paper 10 is discharged from a sheet discharge tray (not illustrated).

Figure 3:
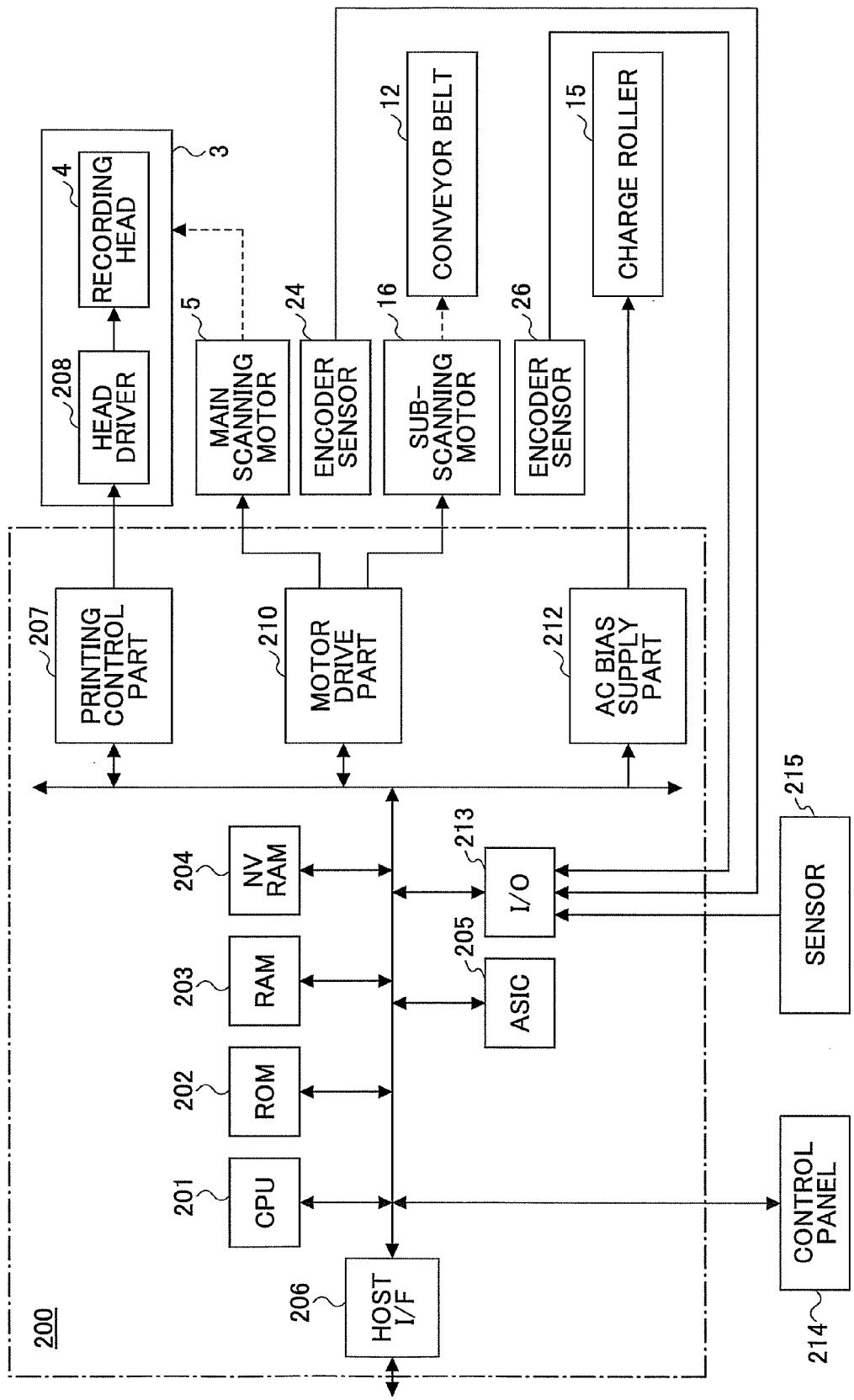
FIG. 3 is an overall block diagram illustrating a control part of an image forming apparatus according to an embodiment of the present invention.

Next, a control part 200 of the image forming apparatus (inkjet recording apparatus) 1000 according to an embodiment of the present invention is described with reference to FIG. 3. FIG. 3 is an overall block diagram illustrating the control part 200 of the image forming apparatus 1000 according to an embodiment of the present invention.

The control part 200 is in charge of overall controls of the image forming apparatus 1000. The control part 200 includes, for example, a CPU (Central Processing Unit) 201, a ROM (Read Only Memory) 202, a RAM (Random Access Memory) 203, a non-volatile memory 204, and an ASIC (Application Specific Integrated Circuit) 205.

The CPU 201 functions as a below-described determination part and a carriage movement control part. The ROM 202 stores various programs executed by the CPU 201 and various data therein. The RAM 203 temporarily stores image data or the like therein. The non-volatile memory 204, which is rewritable, is for storing data even where the image forming apparatus 1000 is disconnected from electric power. The ASIC 205 is for processing input/output signals used for performing signal processes on image data, performing image processes (e.g., sorting), and assisting in controlling the entire image forming apparatus 1000.

The control part 200 also includes a host I/F 206 for transmitting/receiving data or signals with respect to a host, a printing control part 207 including a waveform generating part and a data transferring part for controlling the driving of the recording head 4, a head driver (driver IC) 208 for driving the recording head 4, a motor driving part 210 for driving the main scanning motor 5 and the sub-scanning motor 16, an AC bias supplying part 212 for supplying AC bias to the charging roller 15, and an I/O 213 for inputting detection signals (pulses) from the encoder sensor 24 and/or the encoder sensor 26 along with detection signals from other various sensors 215 (e.g., temperature sensor for detecting ambient temperature which is a factor leading to dot position deviation). Further, the control part 200 is connected to a control panel 214 used for inputting and displaying data used by the image forming apparatus 1000.

In the control part 200, the host I/F 206 receives image data or the like from the host via a cable or a network. The host may be, for example, a data processing apparatus (e.g., a personal computer), an image reading apparatus (e.g., an image scanner), or an image capturing apparatus (e.g., a digital camera).

In the control part 200, the CPU 201 reads out and analyzes printing data included in a reception buffer of the host I/F 206. Then, the ASIC 205 performs various processes on the printing data (e.g., image processing, sorting of data). Then, the processed printing data are transferred from the printing control part 207 to the head driver 208. In this embodiment, the generation of dot pattern data for outputting images is performed by a printer driver of the host side.

The printing control part 207 transfers image data in the form of serial data to the head driver 208. In addition, the printing control part 207 outputs transfer clocks (required for transferring the image data), latch signals, and droplet control signals (mask signals) to the head driver 208. The printing control part 207 has a drive waveform generating part including a D/A converter for performing D/A conversion on pattern data of drive signals stored in the ROM 202 and a drive waveform selecting part for selecting the waveform to be output to the head driver 208. Accordingly, the printing control part 207 generates drive waveforms including one or more drive pulses (drive signals) and outputs the drive waveforms to the head driver 208.

The head driver 208 applies drive signals included in the waveforms output from the printing control part 207 to a driving element (e.g., the above-described piezoelectric element). The driving element generates energy for enabling ink droplets to be selectively jetted from the recording head 4. The head driver 208 applies the drive signals based on serially input image data amounting to a single line formed by the recording head 4. By selecting the drive pulses included in the drive waveform, ink droplets of different sizes including large droplets (large dots), medium droplets (medium dots), and small droplets (small dots) can be jetted from the recording head 4.

The CPU 201 calculates the drive output value (control value) for controlling the main scanning motor 5 and drives the main scanning motor 5 via the motor drive part 210 in accordance with the calculated value. The calculation of the CPU 201 is based on the detected speed value and the detected position value obtained by sampling the detection pulses of the encoder sensor 24 (i.e. pulses of the linear encoder) and the target speed value and the target position value stored beforehand in a speed/position profile. In the same manner, the CPU 201 calculates the drive output value (control value) for controlling the sub-scanning motor 16 and drives the sub-scanning motor 16 via the motor drive part 210 in accordance with the calculated value. The calculation of the CPU 201 is based on the detected speed value and the detected position value obtained by sampling the detection pulses of the encoder sensor 26 (i.e. pulses of the rotary encoder) and the target speed value and the target position value stored beforehand in a speed/position profile.

It is to be noted that various detection signals from the various sensors 215 are input to the control part 200. Further, the control part 200 is connected to the control panel 214 for inputting data to the image forming apparatus 1000 and displaying data.

Figure 4A:
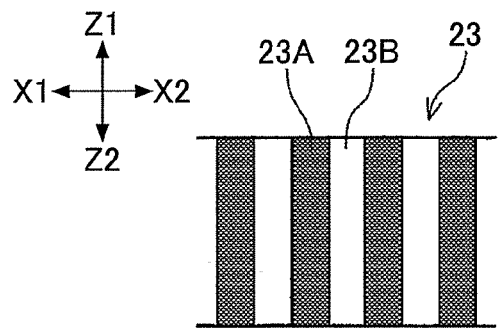
FIG. 4A is an enlarged view illustrating a part of an encoder scale according to an embodiment of the present invention.
Figure 4B:
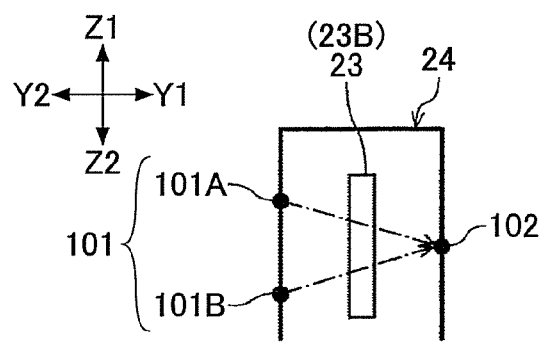
FIG. 4B is a schematic diagram illustrating an encoder sensor in a state facing a transparent part of an encoder scale according to an embodiment of the present invention.
Figure 4C:
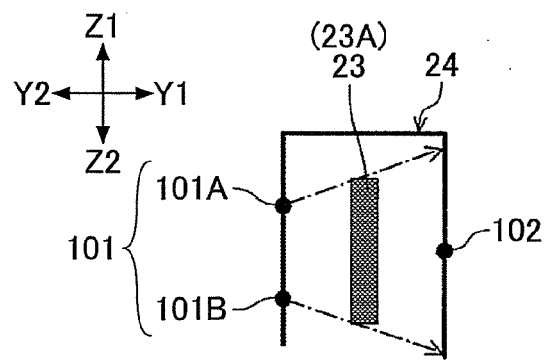
FIG. 4C is a schematic diagram illustrating an encoder sensor in a state facing a light blocking part of an encoder scale according to an embodiment of the present invention.

Next, an encoder including the encoder sensor 24 according to a first embodiment of the present invention is described with reference to FIGS. 4A-4C. FIG. 4A is an enlarged view illustrating a part of the encoder scale 23 according to an embodiment of the present invention. FIG. 4B is a schematic diagram illustrating the encoder sensor 24 in a state facing a transparent part 23B of the encoder scale 23 according to an embodiment of the present invention. FIG. 4C is a schematic diagram illustrating the encoder sensor 24 in a state facing a light blocking part 23A of the encoder scale 23 according to an embodiment of the present invention. It is to be noted that, although the encoder according to this embodiment of the present invention is described as a linear encoder including the encoder scale 23 and the encoder sensor 24, the encoder may also be a rotary encoder including the encoder scale 25 having slits 25A, 25B and the encoder sensor 26. Other than the slits 25A, 25B of the encoder scale 25 being arranged in the peripheral direction of the encoder scale 25, the encoder scale 25 and the encoder sensor 26 of the rotary encoder are substantially the same as the encoder scale 23 and the encoder sensor 24 of the linear encoder.

As illustrated in FIG. 4A, the encoder scale 23 includes a pattern of slits 23A, 23B formed in a manner extending in a longitudinal direction and arranged at intervals of a predetermined width in the main scanning direction. More specifically, in this embodiment, the slits (light blocking parts) 23A for blocking light and the slits (transparent parts) 23B for transmitting light are alternately arranged in the main scanning direction. The slits 23A, 23B of the encoder scale 23 are read by the encoder sensor 24.

As illustrated in FIGS. 4A and 4B, the encoder sensor 24 has a light emitting part 101 including two light sources 101A, 101B and a light receiving part 102 for receiving light irradiated from the two light sources 101A, 101B. The light sources 101A and 101B are arranged at positions facing an upper part and lower part of the slits 23A, 23B with respect to the longitudinal direction of the slits 23A, 23B (i.e. arranged in a direction orthogonal to the direction in which the slits 23A, 23B are arranged). The lights from the light sources 101A and 101B are irradiated towards the light receiving part 102. The phrase "arranged in a direction orthogonal to the direction in which the slits 23A, 23B are arranged" may include a direction intersecting the direction in which the slits 23A, 23B are arranged. That is, the light sources 101A, 101B may be arranged in a direction diagonally intersecting the direction in which the slits 23A, 23B are arranged as long as advantages (effects) of the embodiment of the present invention can be attained. In a case where the encoder is a rotary encoder, the phrase "arranged in a direction orthogonal to the direction in which the slits 23A, 23B are arranged" may include a direction perpendicularly intersecting and diagonally intersecting the tangential lines that are tangential to the circumference of the encoder scale 25 of rotary encoder.

In a case where a light source having a directivity of, for example, an LED (Light Emitting Diode) is used as the light sources 101A, 101B, it is preferable to position the light sources 101A, 101B so that the optical axes of the light sources 101A, 101B are directed to the light receiving part 102. Thereby, the light receiving sensitivity (photo-detection sensitivity) of the light receiving part 102 can be improved. In this embodiment, the distance between the light source 101A and the light receiving part 102 is the same as the distance between the light source 101E and the light receiving part 102.

Next, the effects (advantages) attained by the encoder according to an embodiment of the present invention is described with reference to FIGS. 5A and 5B.

The light receiving part 102 repetitively outputs pulse signals (on/off signals) in correspondence to the relative movement between the encoder scale 23 and the encoder sensor 24. The distance (position) of the relative movement between the encoder scale 23 and the encoder sensor 24 can be obtained by counting the pulse signals repetitively output from the light receiving part 102. Further, by measuring the interval between the pulse edges of the pulse signals repetitively output from the light receiving part 102, the speed of the carriage 3 can be obtained. In a case where the encoder is a rotary encoder including such as the encoder scale 25 and the encoder sensor 26, the light receiving part 102 repetitively outputs pulse signals (on/off signals) in correspondence to the relative movement between the encoder scale 25 and the encoder sensor 26. The angle of the relative movement between the encoder scale 25 and the encoder sensor 26 can be obtained by counting the pulse signals repetitively output from the light receiving part 102. Further, by measuring the interval between the pulse edges of the pulse signals repetitively output from the light receiving part 102, the angular speed of the conveyor roller 13 can be obtained.

As illustrated in FIGS. 5A and 5B, light is irradiated from plural (in this embodiment, two) light sources 101A, 1010 of the light emitting part 101 arranged in a vertical direction of the encoder sensor 24 (longitudinal direction of the slits 23A, 23B) to the light receiving part 102.

Accordingly, as illustrated in FIGS. 5A and 55, in a case where a stain 300 adheres to the transparent part 235 of the encoder scale 23, although a portion of the light irradiated from the light sources 101A, 101B is blocked by the stain 300 on the encoder scale 23, some of the light irradiated from the light sources 101A, 101B is incident on a light receiving surface 104 of the encoder sensor 24. For example, in FIG. 5A, the regions "a" receive light from both light sources 101A, 101B. Further, the regions "b" receive light from one of the light sources 101A, 101B. Further, the region "c", which is located in the vicinity of the stain 300, does not receive light from the light source 101A or the light source 101B. Accordingly, even in a case where there is a stain on the encoder scale 23, the light receiving part 102 can positively receive light from the light emitting part 101 including light sources 101A, 101B when the encoder sensor 24 faces the transparent part 23B of the encoder scale 23.

That is, as illustrated in FIG. 5B, even when the encoder sensor 24 faces the transparent part 23B in a case where the stain 300 is adhered to the encoder scale 23, the stain 300 does not obstruct detection of light by the light receiving part 102. Thus, even in the case where the stain 300 is adhered to the encoder scale 23, the encoder sensor 24 can regularly read the patterns of the encoder scale 23.

It is to be noted that the irradiation of light from plural areas (in this embodiment, two areas) does not adversely affect the reading out of the light blocking part 23A because the light blocking part 23A is configured to have a size (area) significantly larger than the size of the stain 300 (see, for example, FIG. 4C).

Hence, by irradiating light from plural light sources 101A, 101B of the light emitting part 101 to the light receiving part 102, degradation of the detection precision due to a stain on the encoder scale 23 can be prevented.

Figure 6A:
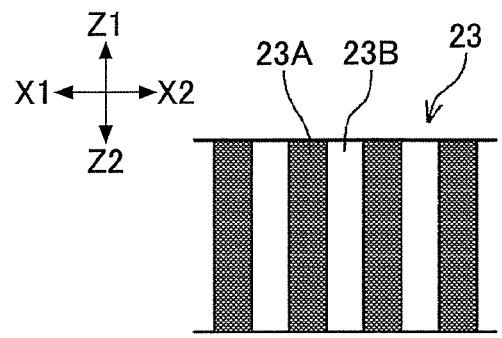
FIGS. 6A-6C are schematic diagrams for describing an encoder including an encoder sensor according to a comparative example.
Figure 6B:
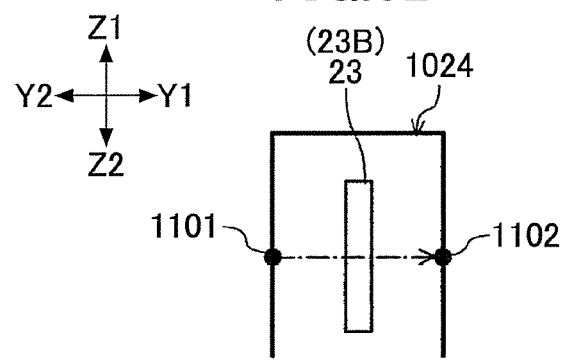
Figure 6C:
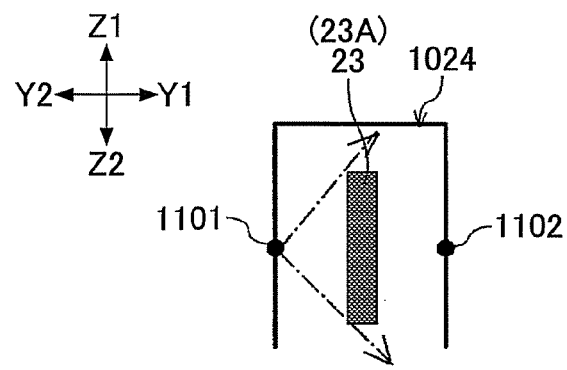

Next, a comparative example of an encoder sensor 1024 is described with reference to FIGS. 6A-7.

The encoder sensor 1024 according to the comparative example includes a light emitting part 1101 having a single light source and a light receiving part 1102 facing the light emitting part (light source) 1101. In the comparative example, the encoder scale 23 is disposed between the light emitting part 1101 and the light receiving part 1102.

Figure 7:
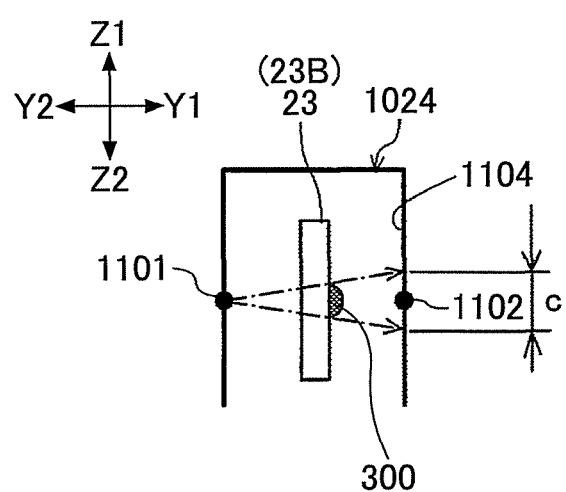
FIG. 7 is a schematic diagram for describing the effects attained by the encoder of the comparative example.

As illustrated in FIG. 7, in a case where a stain 300 is adhered to the transparent part 23B of the encoder scale 23, the light from the light emitting part (light source) 1101 is blocked by the stain 300. Thereby, the region c, which is an area receiving no light from the light emitting part (light source) 1104, is created on a light receiving surface 1104 of the light receiving part 1102. Therefore, in a case where the light receiving part 1102 is located in the region c, the light receiving part 1102 cannot detect light even when the encoder sensor 1024 is facing the transparent part 23B. Accordingly, the encoder sensor 1024 cannot regularly read the patterns of the encoder scale 23.

Next, an encoder including the encoder sensor 24 according to a first example of a second embodiment of the present invention is described with reference to FIGS. 8A-8C. The encoder according to the first example of the second embodiment of the present invention is different from the encoder of the first embodiment from the aspect that the distance between the light source 101A and the light receiving part 102 is different from the distance between the light source 101B and the light receiving part 102. In this embodiment, the light source 101A is positioned closer to the light receiving part 102 than the light source 101B. In the first example of the second embodiment, like components are denoted by like reference numerals of the first embodiment and are not further explained.

Owing to this configuration in which the distance between the light source 101A and the light receiving part 102 is different from the distance between the light source 101B and the light receiving part 102, the amount of light received by the light receiving part 102 changes in a case where the light receiving part 102 receives light from both light sources 101A, 101E as illustrated in FIG. 8A, a case where the light receiving part 102 receives light from only the light source 101A positioned closer to the light receiving part 102 as illustrated in FIG. 8B, and a case where the light receiving part 102 receives light from the light source 101B positioned farther from the light receiving part 102. Accordingly, it can be determined whether a stain 300 is adhered to an upper part of the encoder scale 23 or a lower part of the encoder scale 23. In other words, the position of the stain 300 adhered to the encoder scale 23 can be detected according to the amount of light received by the light receiving part 102.

It is to be noted that even with a configuration where the distance between the light source 101A and the light receiving part 102 is the same as the distance between the light source 101B and the light receiving part 102, detection can be achieved in a similar manner by changing the amount of light irradiated from the light sources 101A and 101B.

Next, an encoder including the encoder sensor 24 according to a second example of a second embodiment of the present invention is described with reference to FIGS. 9A-9C.

The encoder according to the second example of the second embodiment of the present invention is different from the encoder of the first embodiment from the aspect that the light emitted from the light source 1010 has a color different from the color of the light emitted from the light source 101D. In the second example of the second embodiment, like components are denoted by like reference numerals of the first embodiment and are not further explained.

Owing to this configuration in which the light emitted from the light source 101O has a color different from the color of the light emitted from the light source 101D, the light receiving part 102 can detect the position of a stain 300 adhered to the encoder scale 23 depending on the color detected by the light receiving part 102.

Figure 10:
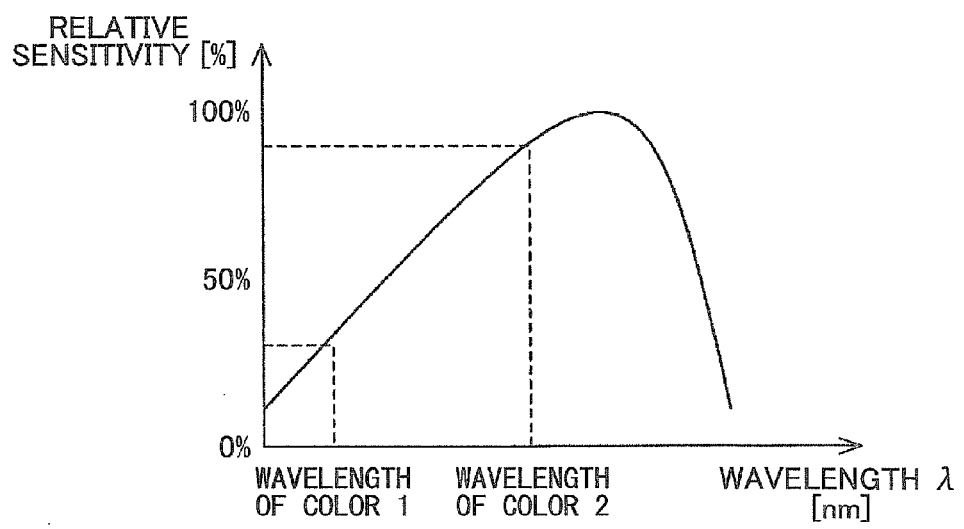
FIG. 10 is a graph for describing the encoder according to the second example of the second embodiment of the present invention.

For example, because a typical optical sensor exhibits different sensitivity characteristics relative to the wavelength of light (as illustrated in FIG. 10), the light receiving part 102 can distinguish different colors by referring to the amount output from an optical sensor included in the light receiving part 102. In the graph of FIG. 10, "color 1" indicates the color of the light emitted from the light source 101O and "color 2" indicates the color of the light emitted from the light source 101D.

Alternatively, by providing an optical sensor(s) dedicated to detect a light of a particular color in the light receiving part 102, the position of the stain 300 can be detected according to the type of sensor detecting the light received by the light receiving part 102.

For example, when a stain 300 is detected on the encoder scale 23 in a vertical direction of the encoder scale 23 (longitudinal direction of the slits 23A, 23B parallel to a surface of the scale 23) by using the above-described first and second examples of the second embodiment in a case where the encoder scale 23 is configured to move in the vertical direction, the encoder scale 23 can be mechanically moved (e.g., upwards) in the vertical direction for avoiding the stain 300.

Figure 11:
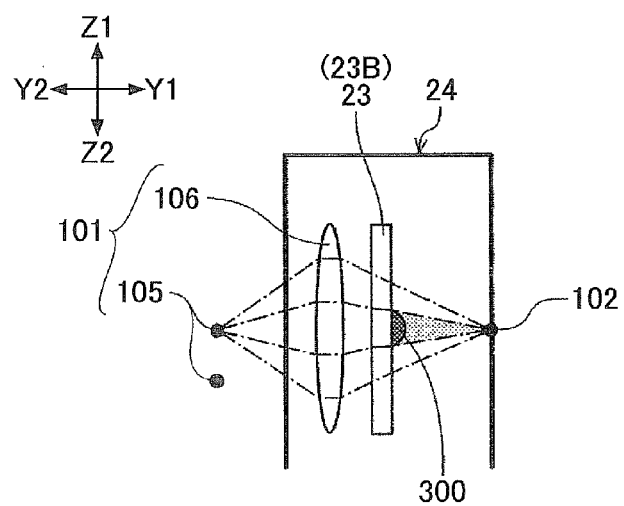
FIG. 11 is a schematic diagram illustrating an encoder including an encoder sensor according to a third embodiment of the present invention.

Next, an encoder including the encoder sensor 24 according to a third embodiment of the present invention is described with reference to FIG. 11. In the third embodiment, like components are denoted by like reference numerals of the first embodiment and are not further explained.

The encoder according to the third embodiment of the present invention is different from the encoder of the first embodiment from the aspect that the light emitting part 101 includes at least one light source 105 and a lens 106 for deflecting (bending) the light emitted from the light source 105. In the third embodiment, it is preferable to position the lens 106 so that the focal point of the lens 106 matches the light receiving part 102.

Owing to the configuration in which the light emitting part 101 includes at least one light source 105 and the lens 106 for deflecting (bending) the light emitted from the light source 105, the light can be emitted from plural areas to the light receiving part 102 without having to increase the number of light sources. Even in a case where the light source 105 is a point light source, the light diverged away from the light receiving part 102 can be directed towards the light receiving part 102. Therefore, the sensitivity of the optical sensor of the light receiving part 102 can be improved even where the amount of power consumption remains the same or the sensor of the light receiving part 102 can maintain the same sensitivity even where the amount of power consumption decreases.

Figure 12:
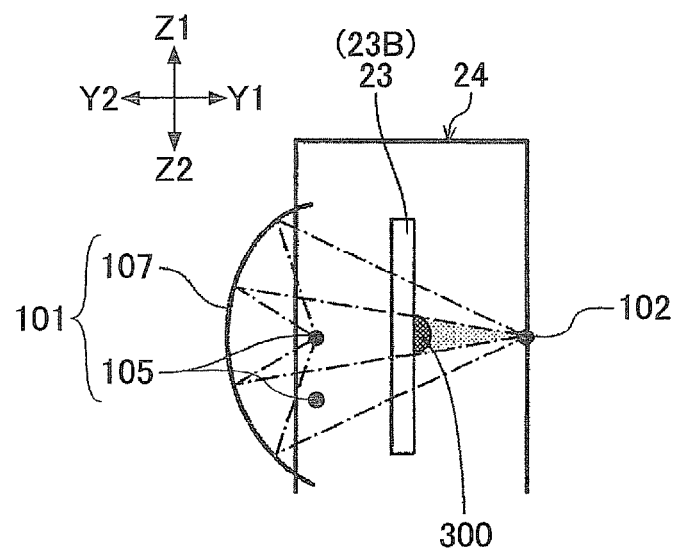
FIG. 12 is a schematic diagram illustrating an encoder including an encoder sensor according to a fourth embodiment of the present invention.

Next, an encoder including the encoder sensor 24 according to a fourth embodiment of the present invention is described with reference to FIG. 12. In the fourth embodiment, like components are denoted by like reference numerals of the first embodiment and are not further explained.

The encoder according to the fourth embodiment of the present invention is different from the encoder of the first embodiment from the aspect that the light emitting part 101 includes at least one light source 105 and a mirror 107 for reflecting the light emitted from the light source 105. In the third embodiment, it is preferable to position the mirror 107 so that all of the lights (lights in the vertical direction of the encoder scale 23 (longitudinal direction of the slits 23A, 23B) reflected from the light emitted from the light source 105 is concentrated to the light receiving part 102.

Owing to the configuration in which the light emitting part 101 includes at least one light source 105 and the mirror 107 for reflecting the light emitted from the light source 105, in a case where the light source 105 is capable of emitting light in all directions, not only the lights oriented towards the light receiving part 102 but also the lights oriented in directions opposite from the light receiving part 102 can be directed to the light receiving part 102. Therefore, the sensitivity of the optical sensor of the light receiving part 102 can be improved even where the amount of power consumption remains the same or the sensor of the light receiving part 102 can maintain the same sensitivity even where the amount of power consumption decreases. Furthermore, manufacturing costs can be reduced compared to that of the third embodiment because mirrors are inexpensive compared to lenses.

Figure 13:
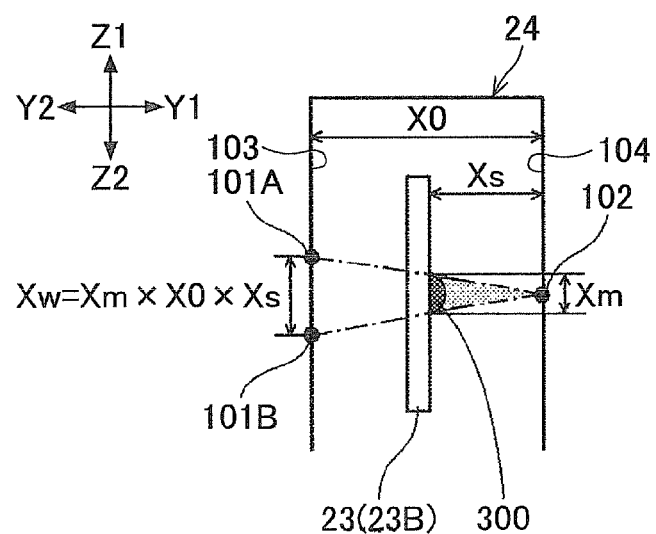
FIG. 13 is a schematic diagram for describing a distance between plural light sources.
Figure 14:
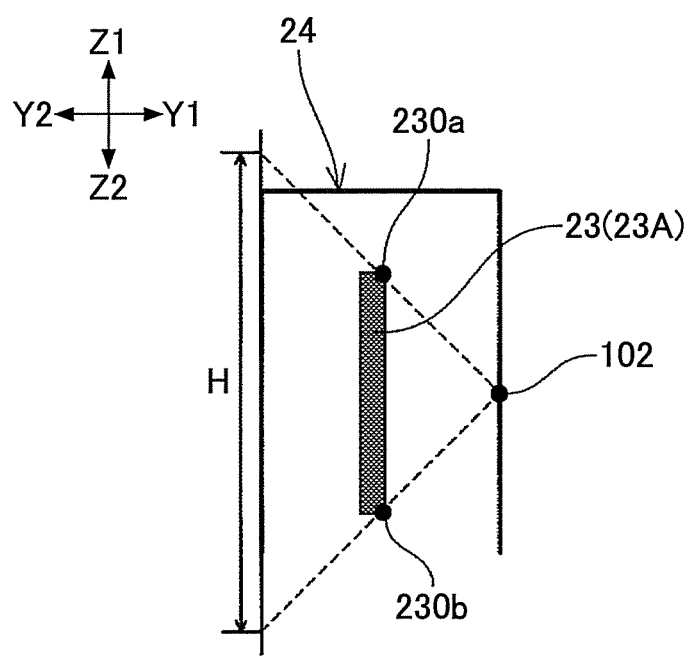
FIG. 14 is a schematic diagram for describing a range of arranging plural light sources.

Next, the distance between light sources 101A, 101E is described with an exemplary configuration of the encoder sensor 24 having plural light sources 101A, 101B with reference to FIGS. 13 and 14.

In the configuration illustrated in FIG. 13, "Xm" indicates an anticipated width of the stain 300 with respect to the vertical direction of the encoder sensor 24, "X0" indicates the distance from an light emitting surface 103 of the encoder sensor 24 to a light receiving surface 104 of the encoder sensor 24, "Xs" indicates the distance from a surface of the encoder scale 23 positioned towards the light receiving surface 104 to the light receiving surface 104, and "Xw" indicates the minimum distance between the light source 101A and the light source 101B obtained by the following Formula (1). By setting the distance between the light source 101A and the light source 101E (distance on the light emitting surface 103) with a value more than a value of "Xw", the light emitted from the light sources 101A, 101B can be incident on the entire area of the light receiving surface 104 (i.e. an area receiving no light can be prevented from being formed on the light receiving surface 104).

$$Xw = Xm \times X0 / Xs \qquad \text{[Formula (1)]}$$

Next, in the configuration illustrated in FIG. 14, "H" indicates a range defined by the straight lines connecting the light receiving part 102 with upper and lower corner ends 230a, 230b of the slit 23 (23A, 23B). In a case where light is emitted from a position(s) outside of range "H", the light will be erroneously detected by the light receiving part 102 even when the light blocking part 23A is facing the encoder sensor 24. Accordingly, the light sources 101a, 101E are to be positioned within the range "H".

In other words, the distance between the light source 101a and the light source 101b of the encoder sensor 24 is to be more than the minimum distance "w" obtained by the Formula (1) and is to fall within the range "h" defined by the light receiving part and the upper and lower corner ends 230a, 230b of the slit 23 (23A, 23B).

Next, a relationship between the arrangement of plural light sources and the arrangement of slits is described with reference to FIGS. 15A and 15B. In the configuration illustrated in FIG. 15A, the position of a light emitting part 1101 having a single light source is moved relative to the slits 23A, 23B of the encoder scale 23. In the configuration illustrated in FIG. 15B, the positions of the light sources 101A, 101A are moved relative to the slits 23A, 23B of the encoder scale 23.

Figure 15A:
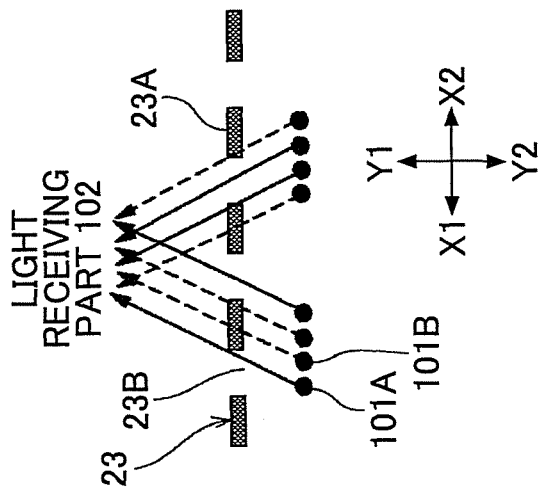
FIGS. 15A-15B are schematic diagrams for describing an arrangement of a light emitting part(s) according to a comparative example.
Figure 15B:
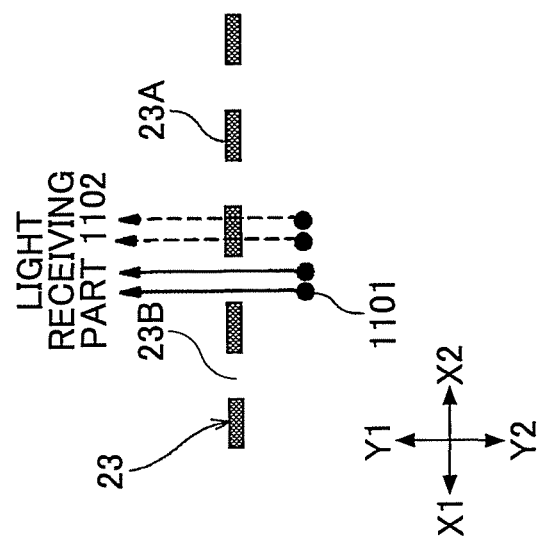

In a case of an encoder sensor including a single light emitting part 1101 having a single light source and a single light receiving part 1102, the encoder sensor outputs signals corresponding to the patterns (slits) 23A, 23B of the encoder scale 23 by repeating detection (the light being illustrated with solid line arrows) and non-detection (the light being illustrated with broke line arrows) with respect to a horizontal direction in the configuration illustrated in FIG. 15A.

In a case of an encoder sensor including plural light sources 101A, 101B arranged in the same direction in which the slits 23A, 23B are arranged, the light emitted from the light sources 101A, 101E may reach the light receiving part 102 even at positions corresponding to the light blocking parts 23A of the encoder scale 23. Accordingly, the encoder sensor cannot output signals corresponding to the patterns (slits) 23A, 23B of the encoder scale 23.

In view of the above, with the encoder sensor 24 according to an embodiment of the present invention, the encoder sensor 24 can output signals corresponding to the patterns (slits) 23A, 23B of the encoder scale 23 by arranging plural light emitting parts (light sources) in a direction orthogonal to a direction in which the plural patterns (slits) 23A, 23B of the encoder scale 23 are arranged.

By using the above-described embodiments of the encoder sensor 24 (26) for the image forming apparatus 1000, degradation of detection precision due to a stain (erroneous readout) can be prevented, and the position and the speed of the carriage 3 and conveying components (e.g., conveyor belt 12, conveyor roller 13) of the image forming apparatus 1000 can be controlled with accuracy. Thereby, high quality images can be formed with the image forming apparatus 1000. Further, failure due to erroneous readout of the encoder can be prevented.

The present invention is not limited to the specifically disclosed embodiments, and variations and modifications may be made without departing from the scope of the present invention.

The present application is based on Japanese Priority Application No. 2010-024911 filed on Feb. 6, 2010, the entire contents of which are hereby incorporated herein by reference.

What is claimed is:

1. An encoder sensor for reading a plurality of slits of an encoder scale, the encoder sensor comprising:
   a light emitting part configured to emit light; and
   a light receiving part configured to receive the light emitted from the light emitting part;
   wherein the light emitting part includes a plurality of light sources including first and second light sources positioned on a light emitting surface;
   wherein the light receiving part is positioned on a light receiving surface that receives light from the plural light sources;
   wherein the plural slits of the encoder scale include light blocking slits and transparent slits;
   wherein each of the transparent slits is configured to transmit the light from the plural light sources;
   wherein a distance between the first and the second light sources is more than a minimum distance between the first and the second light sources;
   wherein the minimum distance between the first and the second light sources is obtained by a formula of $Xw = Xm \times X0/Xs$;
   wherein "Xw" indicates the minimum distance between the first and the second light sources, "Xm" indicates an anticipated width of a stain adhered to the encoder scale, "X0" indicates a distance between the light emitting surface and the light receiving surface, and "Xs" indicates a distance between the encoder scale and the light receiving surface.

2. The encoder sensor as claimed in claim 1, wherein the light emitting part includes a lens for deflecting the light to the light receiving part.

3. The encoder sensor as claimed in claim 1, wherein the light emitting part includes a mirror for reflecting the light to the light receiving part.

4. The encoder sensor as claimed in claim 1,
   wherein the first and the second light sources are positioned within a range that is defined by straight lines connecting the light receiving part with upper and lower corner ends of one of the plurality of slits.

5. The encoder sensor as claimed in claim 1, wherein the first and the second light sources are arranged in a direction orthogonal to a direction in which the plural slits are arranged.

6. The encoder sensor as claimed in claim 1,
   wherein each of the light blocking slits is configured to block the light from the plural light sources,
   wherein the light blocking slits and the transparent slits are alternately arranged.

7. An image forming apparatus for forming an image on a recording medium, the image forming apparatus comprising:
   a carriage including a recording head for ejecting a liquid to the recording medium and configured to move in a main scanning direction;
   an encoder scale including a plurality of slits; and
   an encoder sensor for detecting the movement of the carriage by reading the plural slits of the encoder scale, the encoder sensor including a light emitting part configured to emit light, and a light receiving part configured to receive the light emitted from the light emitting part;
   wherein the light emitting part includes a plurality of light sources including first and second light sources positioned on a light emitting surface;
   wherein the light receiving part is positioned on a light receiving surface that receives light from the plural light sources;
   wherein the plural slits of the encoder scale include light blocking slits and transparent slits;
   wherein each of the transparent slits is configured to transmit the light from the plural light sources;
   wherein a distance between the first and the second light sources is more than a minimum distance between the first and the second light sources;
   wherein the minimum distance between the first and the second light sources is obtained by a formula of $Xw = Xm \times X0/Xs$;
   wherein "Xw" indicates the minimum distance between the first and the second light sources, "Xm" indicates an anticipated width of a stain adhered to the encoder scale, "X0" indicates a distance between the light emitting surface and the light receiving surface, and "Xs" indicates a distance between the encoder scale and the light receiving surface.

8. The image forming apparatus as claimed in claim 7, wherein the light emitting part includes a lens for deflecting the light to the light receiving part.

9. The image forming apparatus as claimed in claim 7, wherein the light emitting part includes a mirror for reflecting the light to the light receiving part.

10. The image forming apparatus as claimed in claim 7,
    wherein the first and the second light sources are positioned within a range that is defined by straight lines connecting the light receiving part with upper and lower corner ends of one of the plurality of slits.

11. The image forming apparatus as claimed in claim 7, wherein the first and the second light sources are arranged in a direction orthogonal to a direction in which the plural slits are arranged.

12. The image forming apparatus as claimed in claim 7, wherein each of the light blocking slits is configured to block the light from the plural light sources,
wherein the light blocking slits and the transparent slits are alternately arranged.

\* \* \* \* \*